(12) United States Patent
Bullock (10) Patent No.: US 11,560,775 B2
(45) Date of Patent: Jan. 24, 2023

(54) CATWALK FLUID AND GROUND PROTECTION RECOVERY SYSTEM

(71) Applicant: Brandon Bullock, Benalto (CA)

(72) Inventor: Brandon Bullock, Benalto (CA)

( * ) Notice: Subject to any disclaimer, the term of this patent is extended or adjusted under 35 U.S.C. 154(b) by 460 days.

(21) Appl. No.: 16/590,014

(22) Filed: Oct. 1, 2019

(65) Prior Publication Data

US 2021/0095545 A1 Apr. 1, 2021

(51) Int. Cl.
| | | |
|---|---|---|
| *E21B 19/14* | (2006.01) |
| *E21B 41/00* | (2006.01) |
| *F16N 31/00* | (2006.01) |
| *B65D 81/26* | (2006.01) |
| *B65D 1/34* | (2006.01) |
| *E21B 19/15* | (2006.01) |

(52) U.S. Cl.
CPC ............... *E21B 41/00* (2013.01); *B65D 1/34* (2013.01); *B65D 81/261* (2013.01); *E21B 19/14* (2013.01); *E21B 41/005* (2013.01); *F16N 31/002* (2013.01); *F16N 31/006* (2013.01); *B65D 2519/008* (2013.01); *E21B 19/155* (2013.01)

(58) Field of Classification Search
CPC ........ E21B 19/14; E21B 41/005; E21B 41/00; E21B 19/155; B65D 1/34; B65D 81/261; B65D 23/06; B65D 47/40; B65D 81/26; B65D 81/262; B65D 2519/008; F16N 13/002; F16N 31/006; F16N 31/00; F16N 31/02; Y10T 137/5762; Y10T 137/5835; B05B 14/00; B60H 1/3233

USPC ................. 211/70.4; 220/571–573; 210/248; 184/106; 137/312–314; 175/85; 126/51; 296/38; 239/120, 121
See application file for complete search history.

(56) References Cited

U.S. PATENT DOCUMENTS

| | | | | |
|---|---|---|---|---|
| 725,679 | A | * | 4/1903 | Dare .......................... C23C 2/00 118/501 |
| 975,244 | A | * | 11/1910 | Howze .................... F23D 11/44 431/229 |
| 2,783,848 | A | * | 3/1957 | Beskid ................... F16N 31/006 180/69.1 |
| 2,985,448 | A | * | 5/1961 | Hancock ................ F16M 11/42 23/302 T |
| 3,815,702 | A | * | 6/1974 | Paananen ............... F16N 31/006 180/69.1 |
| 4,201,307 | A | * | 5/1980 | Malloy .................. F16N 31/006 229/189 |
| 4,577,713 | A | * | 3/1986 | Moon .................... F16N 31/006 180/69.1 |
| 4,682,672 | A | * | 7/1987 | Berger ............... F01M 11/0004 220/326 |
| D341,366 | S | * | 11/1993 | Tricarico ....................... D34/12 |

(Continued)

*Primary Examiner* — Jennifer E. Novosad
(74) *Attorney, Agent, or Firm* — Berg Hill Greenleaf Ruscitti LLP (57) ABSTRACT

A removable fluid capturing system adapted for installation onto a support structure/frame located under an oil rig catwalk, said fluid capturing system comprising: an elongated trough adapted for insertion under an aperture located on said catwalk; means to secure said trough to structure of the catwalk wherein, upon use, the system is capable of collected fluid seeping from removed pipes through said aperture and directing the fluid to a catchment basin located at a position proximate said second end of the trough. Also disclosed are methods using such system.

2 Claims, 8 Drawing Sheets

(56) References Cited

U.S. PATENT DOCUMENTS

| | | | | |
|---|---|---|---|---|
| 5,483,562 | A * | 1/1996 | Kornfeldt | G21C 19/02 220/9.1 |
| 5,526,900 | A * | 6/1996 | Mason | F16N 31/006 180/69.1 |
| 5,967,200 | A * | 10/1999 | Hall | F16N 31/006 141/311 A |
| 6,202,863 | B1 * | 3/2001 | Grenier | B65D 88/123 414/22.62 |
| 6,378,639 | B1 * | 4/2002 | Murray | F16N 31/006 180/69.1 |
| 6,428,699 | B1 * | 8/2002 | Iwata | B29C 66/5472 210/172.3 |
| 6,450,330 | B1 * | 9/2002 | Cannata | E21B 19/14 206/443 |
| 6,945,362 | B1 * | 9/2005 | Sumpter, Sr. | F16N 31/002 184/106 |
| 7,861,828 | B1 * | 1/2011 | Shepard | B66F 7/0641 187/218 |
| 8,097,155 | B2 * | 1/2012 | Ennis | B01D 29/58 210/257.1 |
| 8,910,803 | B2 * | 12/2014 | Holtby | F16L 3/2235 211/70.4 |
| 9,080,336 | B1 * | 7/2015 | Yantis | E21B 19/14 |
| 9,802,689 | B2 * | 10/2017 | Hudson | B63H 21/386 |
| 9,927,065 | B2 * | 3/2018 | Hester | F16N 31/02 |
| 10,561,241 | B2 * | 2/2020 | Albarran | A47F 5/0025 |
| 11,040,300 | B1 * | 6/2021 | Kulbeth | B01D 19/0068 |
| 11,064,863 | B2 * | 7/2021 | Manooki | A47J 47/20 |
| 11,098,621 | B2 * | 8/2021 | Tilbury | F01M 11/0408 |
| 2010/0078243 | A1 * | 4/2010 | Tokarik | F16N 31/00 180/69.1 |
| 2010/0163247 | A1 * | 7/2010 | Wright | E21B 19/155 166/380 |
| 2012/0046115 | A1 * | 2/2012 | Chernek | B21K 27/00 470/57 |
| 2012/0061400 | A1 * | 3/2012 | Rice | E06C 7/143 220/571 |
| 2012/0118639 | A1 * | 5/2012 | Gerber | E21B 19/15 175/52 |
| 2013/0306153 | A1 * | 11/2013 | Holtby | E21B 7/00 137/1 |
| 2016/0178123 | A1 * | 6/2016 | Beaver | F16N 31/006 220/571 |
| 2017/0081008 | A1 * | 3/2017 | Hudson | F01M 11/0408 |
| 2017/0268316 | A1 * | 9/2017 | Vega | E21B 33/03 |
| 2017/0370525 | A1 * | 12/2017 | Hester | F16N 31/006 |
| 2018/0010844 | A1 * | 1/2018 | Booz | F24F 13/222 |
| 2018/0328157 | A1 * | 11/2018 | Bishop | F04B 53/22 |
| 2019/0264647 | A1 * | 8/2019 | Schurtenberger | F03B 3/18 |
| 2019/0352982 | A1 * | 11/2019 | Arefi | E21B 19/155 |
| 2020/0130017 | A1 * | 4/2020 | Trifol | E21B 37/00 |
| 2020/0216301 | A1 * | 7/2020 | Plourde | B67C 11/02 |
| 2021/0054968 | A1 * | 2/2021 | Crombie | F16N 31/006 |
| 2021/0095545 | A1 * | 4/2021 | Bullock | B65D 81/261 |
| 2022/0010677 | A1 * | 1/2022 | Duncan | E21B 49/088 |

* cited by examiner

CATWALK FLUID AND GROUND PROTECTION RECOVERY SYSTEM

FIELD OF THE INVENTION

The invention relates to the field of oil drilling on oil rigs and service rigs, more specifically to the implementation of equipment on oil rig/service rig catwalks.

BACKGROUND OF THE INVENTION

During drilling and servicing operations, there are several times when the drill pipe/tubing needs to be removed from the well. The removal of pipe from a well requires the dismantling of connections between drill pipe and tubing sections. Once dismantled, the drill pipe/tubing are set down on a catwalk located right next to the rig. The pipe is then stacked aside until the operations require them to be reinserted down the well. Unfortunately, during this operation of removal and pipe stacking, there can be a substantial amount of fluid loss on the ground. The fluid can be oil, brine, mud or other fluid but it is generally considered contaminated and deleterious to the environment. Capturing this fluid prior to its spillage on the ground is becoming a major concern for oil rig operators as regulatory bodies are increasingly putting emphasis on the elimination of small to medium sized oil spills.

The amount of contaminated fluid that spills on to the ground varies with type and depth of the well drilled. Wells drilled in Alberta can be as shallow as 500 m and as deep as over 6000 m. An average well drilled in Alberta in 2011 was 2500 m. In 2018, the average well depth is thought to be over 3000 m deep. A 3000 m well means that there are approximately 300 joints of drill pipe being pushed up the catwalk plus at the end of the well all 300 joints needs to be laid down and put back in the pipe tubs for transportation to the next well. The amount of contaminant dripping out of the drill pipe that spills out of each tube length is estimated at between 1 half to one liter per joint and much higher when laying down pipe at closer to one to two liters per joint. At the low end of this estimate, that translates to 600 to 1500 liters of contaminated fluid that spills on the ground. This does not take into consideration any problem a rig has where they may need to pick pipe up and down several more time in the life of a well being drilled. It is estimated that there are currently over two hundred rigs working in Canada as of July 2018 with many more during the peak drilling season in the fall and winter. This translates into a lot of invert, brine & other contaminants unnecessarily being spilt on the ground. This only means when the rig is moved off location, construction people will need to remove contaminated soil for disposal adding huge costs in reclamation work, trucking costs and more contaminants in landfills.

There is currently no way to prevent or minimize fluid spillage through the aperture located in the catwalk of oil rigs. The present invention corrects this deficiency and overcomes the need to resort soil remediation to remove the contaminants spilled from the removal of tubulars.

SUMMARY OF THE INVENTION

According to an aspect of the present invention, there is provided a removable fluid capturing system adapted for installation onto the support structure located under an oil rig catwalk, said fluid capturing system comprising: an elongated trough adapted for insertion under an aperture located on said catwalk, said trough having a first extremity adapted for positioning proximate the oil rig and a second extremity adapted for positioning distal the oil rig; means to secure said trough to a support structure of the catwalk wherein, upon use, the system is capable of collected fluid seeping from removed pipes through said aperture and directing the fluid to a reservoir located at a position proximate said second extremity of the trough.

Preferably, the second extremity of the trough comprises a wall adapted to retain the fluid inside the trough when the catwalk is in an inclined position. More preferably, the first extremity of the trough also comprises a wall.

More preferably, the wall located at the second extremity of the trough comprises a valve capable of allowing collected fluid to drain from the trough. Even more preferably, the valve is fitted with tubing designed to direct the fluid away from the catwalk. According to a preferred embodiment of the present invention, fluid collected by the trough is directed into a reservoir for future treatment or disposal.

According to another aspect of the present invention, there is provided a method to reduce fluid spillage around an oil rig catwalk, said method comprises: providing a removable fluid capturing system adapted for installation onto a support structure/frame located under an oil rig catwalk, said fluid capturing system comprising: an elongated trough adapted for insertion under an aperture located on said catwalk; means to secure said trough to the structure of the catwalk; and installing said system under the aperture located along the catwalk between the aperture and a wire pulling a skate wherein, upon use, the system is capable of collected fluid seeping from removed pipes through said aperture and directing the fluid to a reservoir located at a position proximate said second end of the trough.

BRIEF DESCRIPTION OF THE FIGURES

The invention may be more completely understood in consideration of the following description of various embodiments of the invention in connection with the accompanying figures, in which.

DETAILED DESCRIPTION

As illustrated in accompanying FIGS. 1, 2, 3, and 4, oil rig catwalks are designed with a narrow trough with a 2" gap built into the top that a "skate" travels along the length through the use of a cable pushing the drill pipe and other tubulars up to the drill floor. In doing so, any residual drilling fluids that are in the pipe leak through the top trough and onto the ground.

Figure 1:
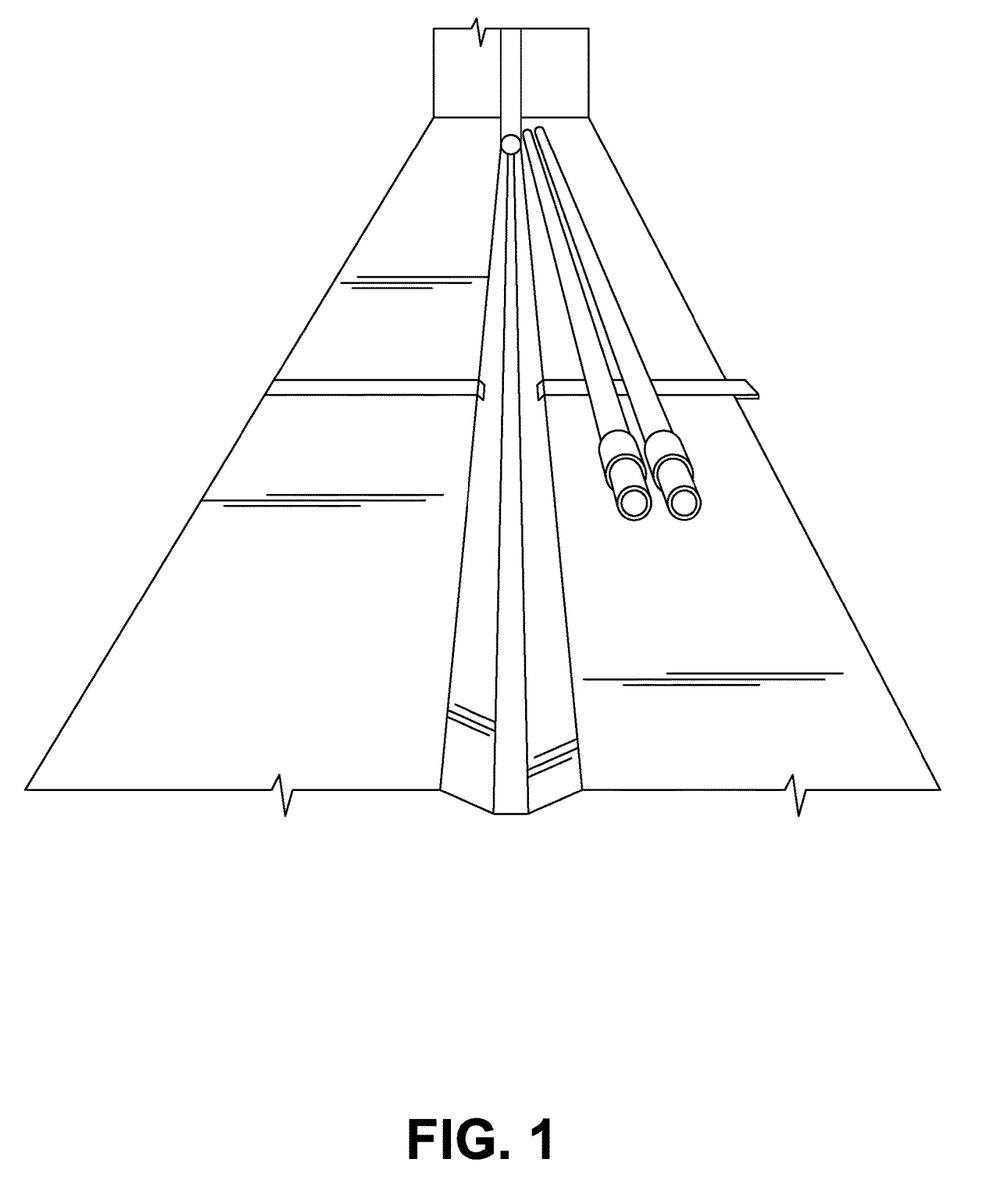
FIG. 1 is a top view of a catwalk used in conjunction with an oil rig during well drilling operations.
Figure 2:
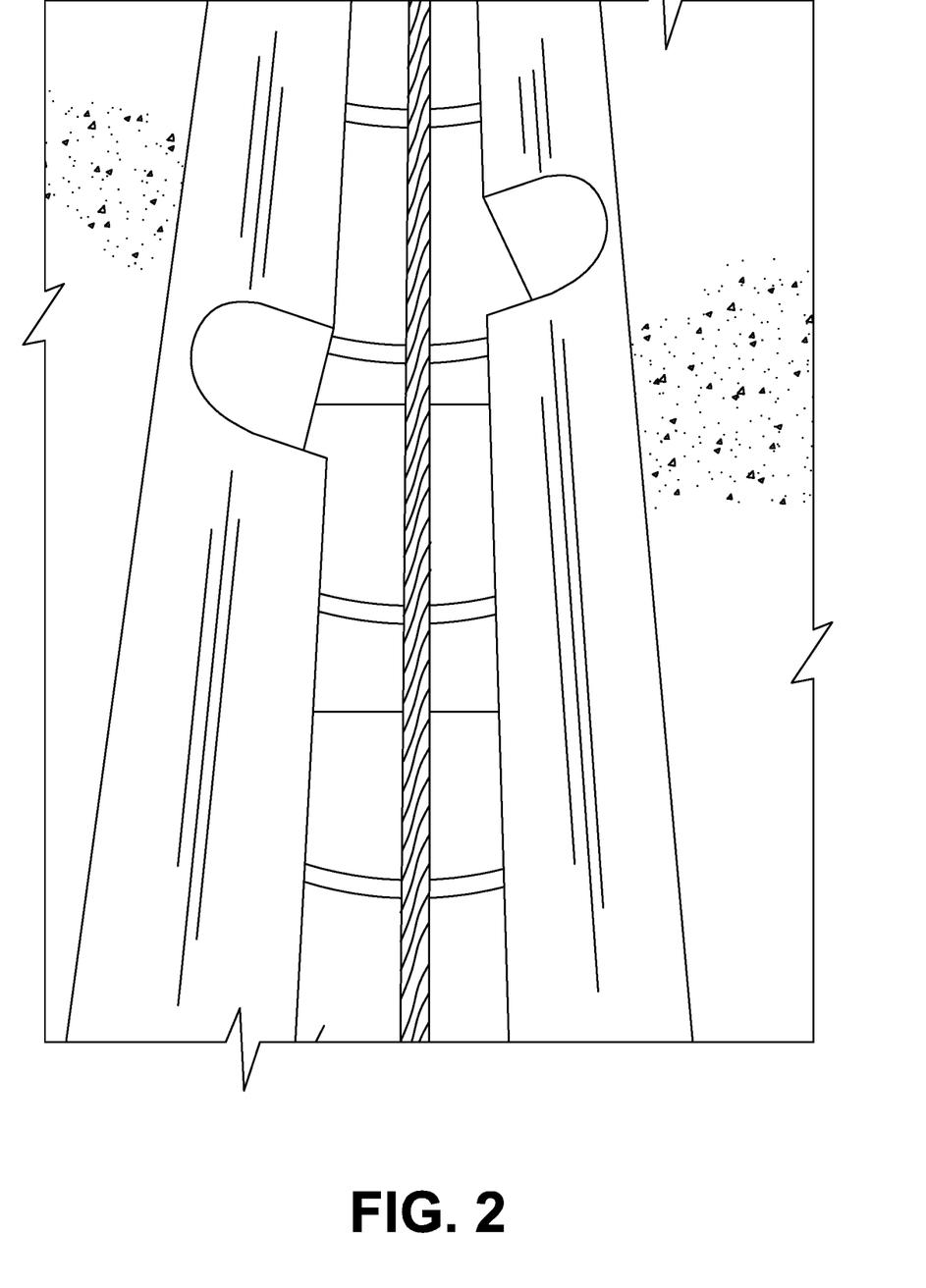
FIG. 2 is a close-up view of the aperture in a catwalk used in conjunction with an oil rig during well drilling operations.
Figure 3:
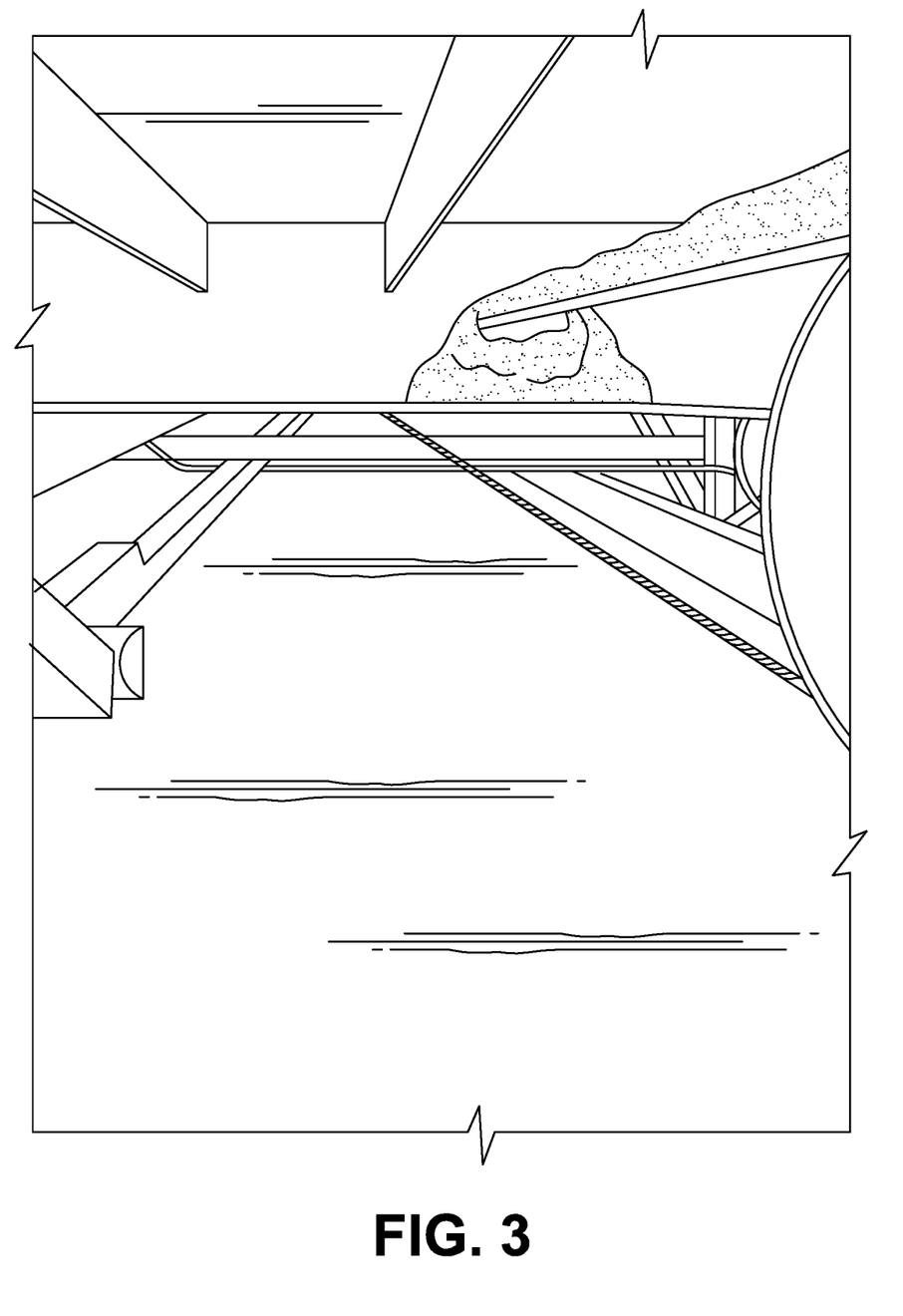
FIG. 3 is a view from underneath a catwalk used in conjunction with an oil rig during well drilling operations.
Figure 4:
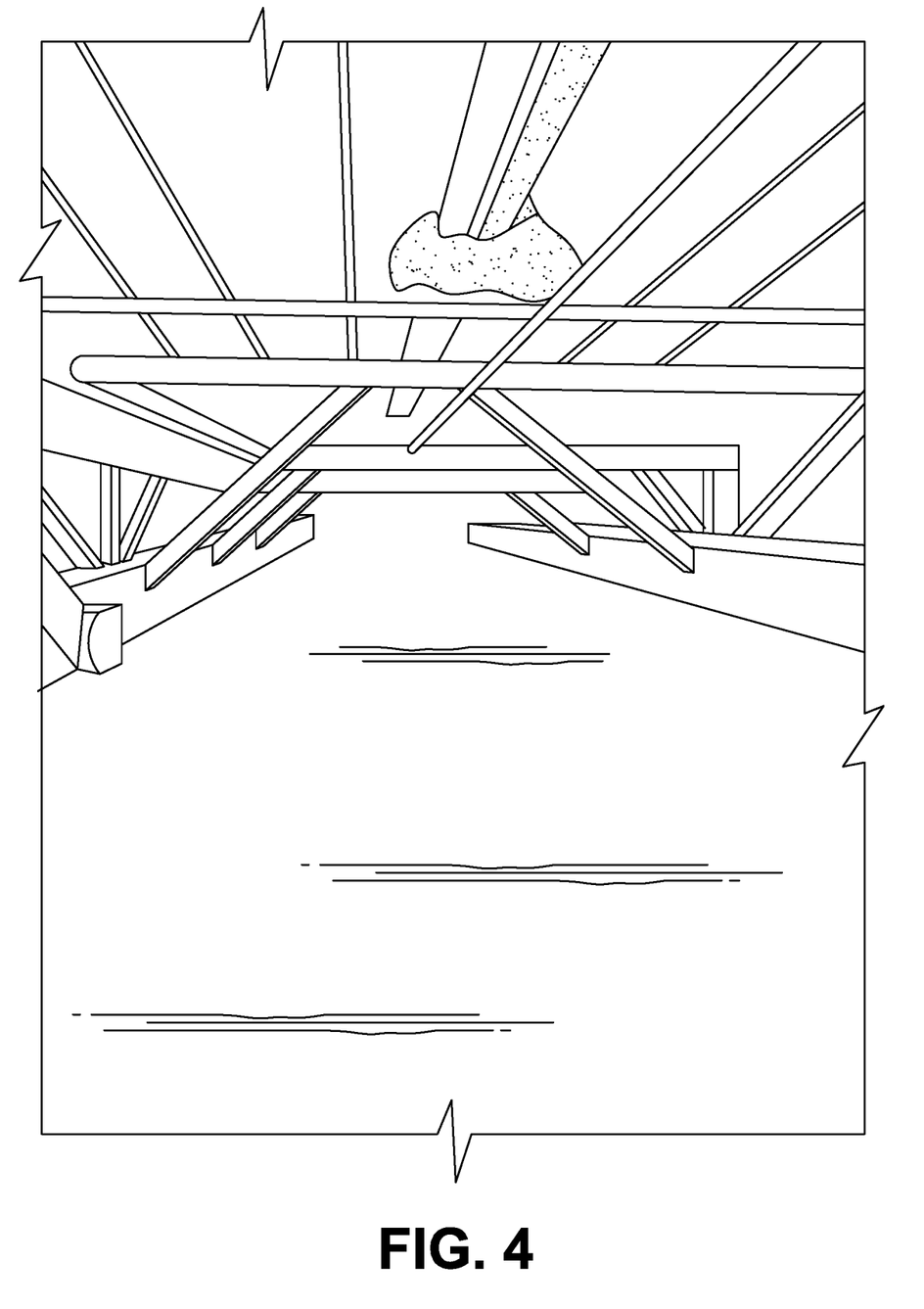
FIG. 4 is a view from underneath of a catwalk used in conjunction with an oil rig during well drilling operations showing the spillage of fluid onto the ground located directly underneath the longitudinal aperture in the catwalk.
Figure 5:
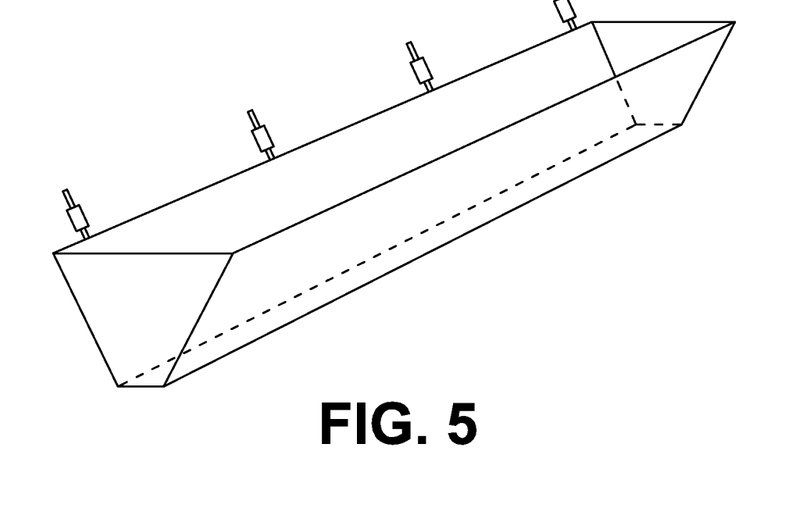
FIG. 5 is a perspective view of a removable fluid capturing system according to a preferred embodiment of the present invention.

According to a preferred embodiment of the present invention as illustrated in FIG. 5, a removable fluid capturing system is designed to be positioned under the above-mentioned gap in the catwalk and hence catch all contaminated fluid seeping through this aperture from spilling onto the ground. The trough is approximately fifty feet long in order to run the entire length of the catwalk. It is built out of 14-gauge steel bent in a V-shape. It is 14 inches across the top has a two-inch flat bottom adapted to attach a drain fitting. According to a preferred embodiment of the present invention, at a total height of six inches, it will fit under any catwalk with little to no modifications to any drilling or service rig in the industry. Again, according to a preferred embodiment of the present invention, at one of the extremity of the trough a valve and two-inch hose is attached and the contaminated fluid drains into a holding tank. The accumulated fluid can then be removed by sucking out with the rigs existing vacuum unit for subsequent disposal.

According to another preferred embodiment of the present invention, the trough is attached along the length of the catwalk using turnbuckles attached to the trough and then on to cross beams under the catwalk. This results in never having to remove the trough unless necessary to effect repairs to the rig equipment.

Figure 6:
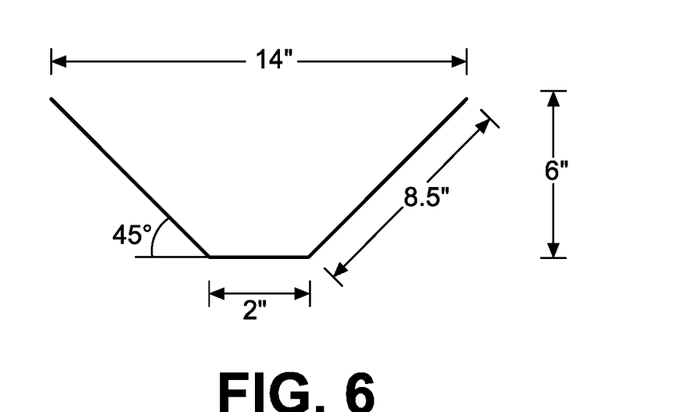
FIG. 6 is a front view of a removable fluid capturing system according to a preferred embodiment of the present invention.

FIG. 6 is a front view of a removable fluid capturing system according to a preferred embodiment of the present invention. The dimensions are given in inches and thus, for a trough having 6 inches in height, the side walls have a length of 8.5 inches with a bottom wall of 2 inches.

Figure 7:
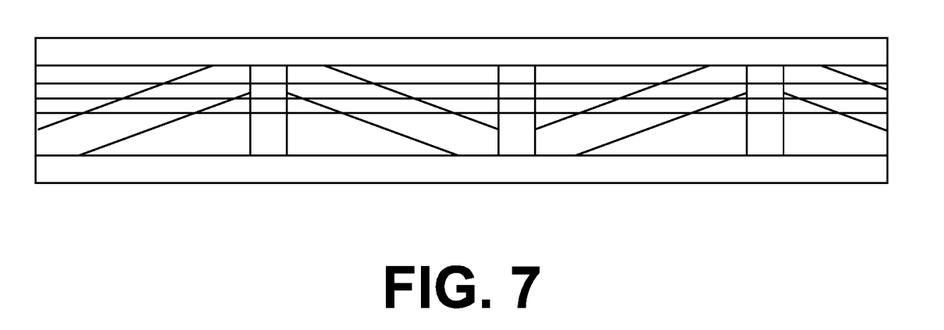
FIG. 7 is a side view of a removable fluid capturing system according to a preferred embodiment of the present invention mounted on the support structure of a catwalk.

FIG. 7 is a side view of a removable fluid capturing system according to a preferred embodiment of the present invention mounted on the support structure of a catwalk. Preferably, the trough is to be secured to the structure at every 2 feet on both sides of the trough.

Figure 8:
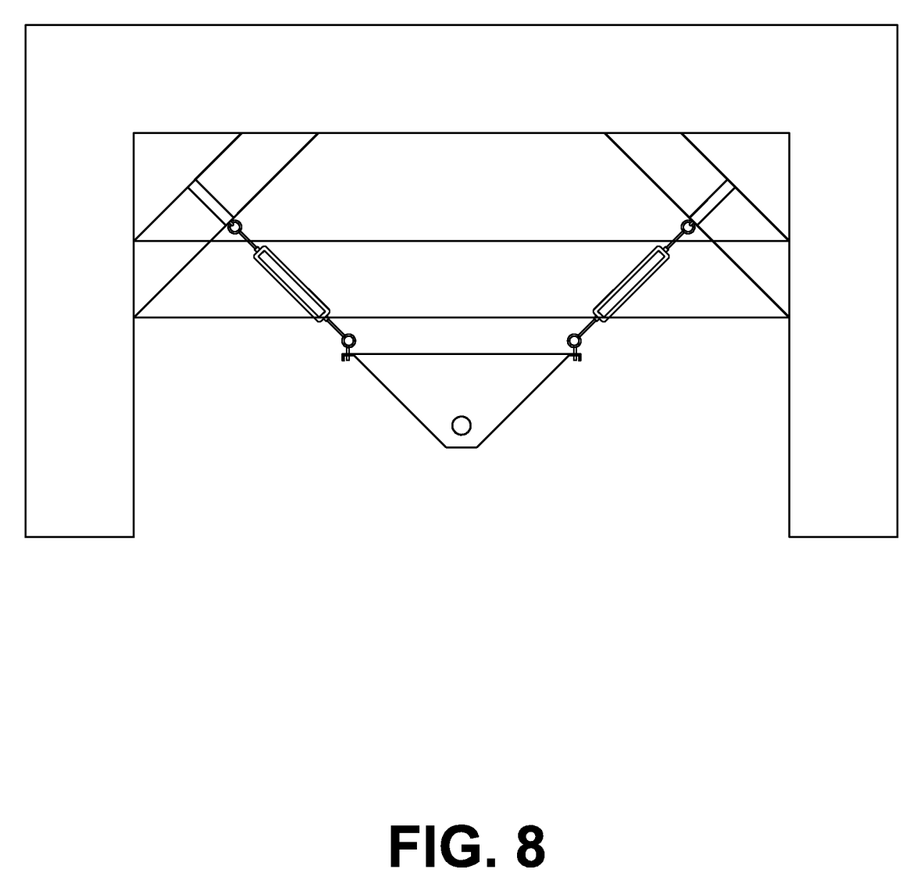
FIG. 8 is a close-up front view of a removable fluid capturing system according to a preferred embodiment of the present invention mounted on the support structure of a catwalk.

FIG. 8 is a close-up front view of a removable fluid capturing system according to a preferred embodiment of the present invention mounted on the support structure of a catwalk. The trough is secured to a mid-section cross-beam located within the structure of the catwalk. Many different means of securing the trough to the catwalk can be employed. Preferably, one would use adjustable securing means. Other means which can be employed are permanent securing means such as welding and other non-removable or difficult to remove means would fall under the understanding of permanent securing means.

Figures 9, 10:
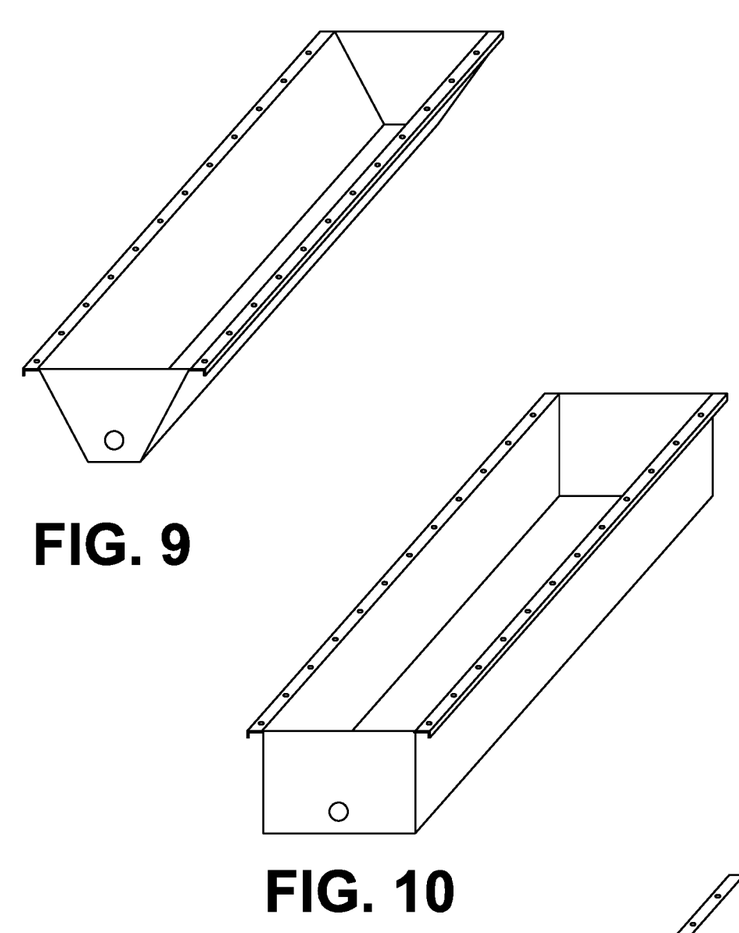
FIG. 9 is a close-up front view of the shape of the trough of a removable fluid capturing system according to a preferred embodiment of the present invention.
FIG. 10 is a close-up front view of the shape of the trough of a removable fluid capturing system according to another preferred embodiment of the present invention.

FIG. 9 is a close-up front view of the shape of the trough of a removable fluid capturing system according to a preferred embodiment of the present invention.

FIG. 10 shows a close-up front view of the shape of the trough of a removable fluid capturing system according to another preferred embodiment of the present invention.

Figure 11:
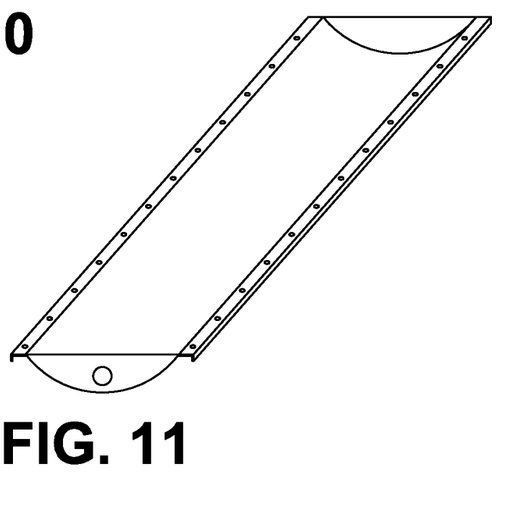
FIG. 11 is a close-up front view of the shape of the trough of a removable fluid capturing system according to another preferred embodiment of the present invention.

FIG. 11 shows a close-up front view of the shape of the trough of a removable fluid capturing system according to another preferred embodiment of the present invention. Each one provides an advantage over the other, this could be in the installation, the manufacturing, the handling, the volume containment, etc. Ideally, one will select the trough most appropriate for the task based on the person's understanding of the needs and advantages of each trough shape.

According to another aspect of the present invention, there is provided a kit for a removable fluid capturing system adapted for installation onto the support structure/frame located under an oil rig catwalk, said fluid capturing system comprising: an elongated trough adapted for insertion under an aperture located on said catwalk; means to secure said trough to the structure of the catwalk, wherein, upon use, the system is capable of collected fluid seeping from removed pipes through said aperture and directing the fluid to a catchment basin located at a position proximate said second end of the trough.

According to another aspect of the present invention, there is provided a use of a removable fluid capturing system adapted for installation onto a support structure/frame located under an oil rig catwalk, said fluid capturing system comprising: an elongated trough adapted for insertion under an aperture located on said catwalk; means to secure said trough to the structure of the catwalk; wherein, upon use, the system is capable of collected fluid seeping from removed pipes through said aperture and directing the fluid to a catchment basin located at a position proximate said second end of the trough.

Figure 12:
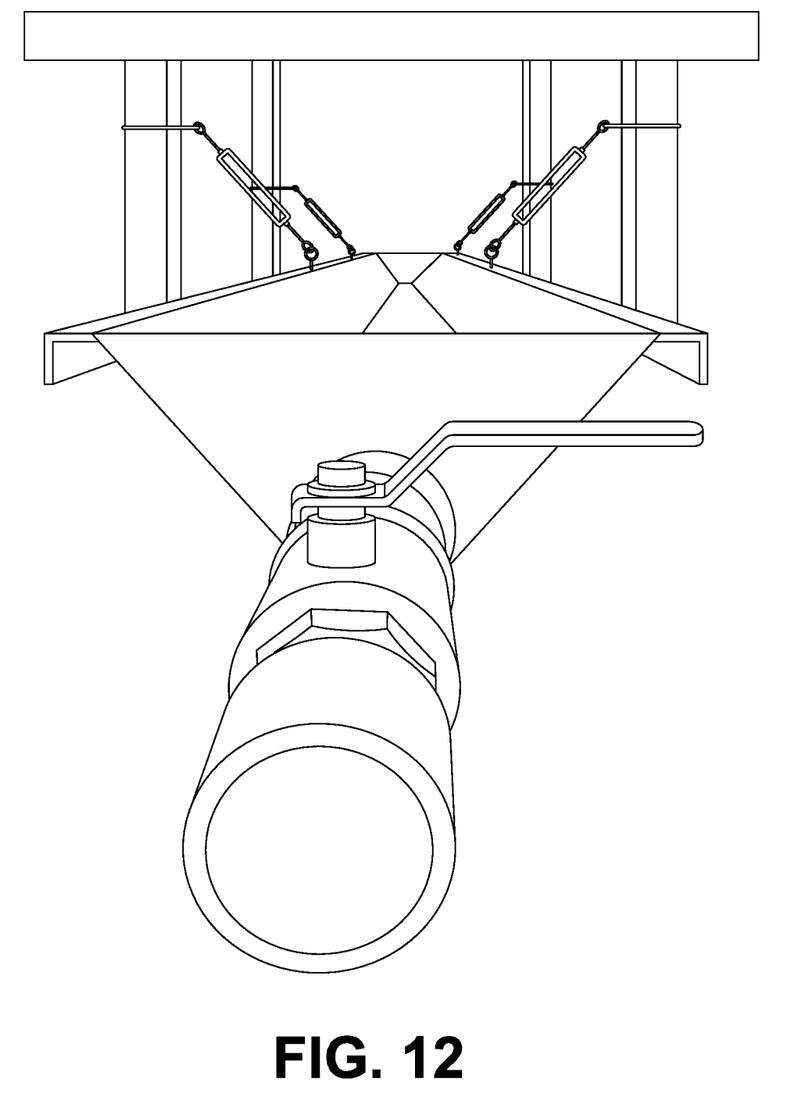
FIG. 12 is a front view of a removable fluid capturing system according to a preferred embodiment of the present invention with the drain valve at the forefront.

FIG. 12 is a front view of a removable fluid capturing system according to a preferred embodiment of the present invention with the drain valve at the forefront. The system is positioned under the cable of the catwalk's skate. This allows the catwalk's skate freedom of displacement unencumbered by the presence of the system according to the present invention. The installation of this system was performed after the manufacturing of the catwalk. An advantage of the present invention is that the system can be retrofitted on most catwalks without much work (i.e. without spending a lot of time or money to effect modifications to install the system).

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A removable fluid capturing system adapted for installation onto a support structure located under an oil rig catwalk, said fluid capturing system comprising:
   a catwalk having an aperture formed therein;
   removed pipes from said oil rig having fluid therein and said removed pipes placed on said catwalk;
   an elongated trough inserted under the aperture located on said catwalk, said trough having first and second ends;
   means to secure said trough to the catwalk; and
   wherein the system collects the fluid seeping from the removed pipes through said aperture and directs the fluid to a catchment basin located at a position proximate said second end of the elongated trough.

2. A method to reduce fluid spillage around an oil rig catwalk, said method comprising:

providing a catwalk having an aperture formed therein;

placing removed pipes from said oil rig having fluid therein on said catwalk;

providing a removable fluid capturing system adapted for installation onto a support structure located under the catwalk, said fluid capturing system comprising: an elongated trough adapted for insertion under the aperture of said catwalk, said trough having first and second ends; and means to secure said trough to the structure of the catwalk;

installing said system under the aperture located along the catwalk between the aperture and a wire pulling a skate; and wherein the system collects fluid seeping from the removed pipes through said aperture and thereafter directing the fluid to a reservoir located at a position proximate said second end of the trough.

\* \* \* \* \*